UNITED STATES PATENT OFFICE.

A. R. MOEN, OF NEW YORK, N. Y.

IMPROVED MODE OF CONSTRUCTING WALLS AND FLOORS OF CELLARS.

Specification forming part of Letters Patent No. 14,323, dated February 26, 1856.

*To all whom it may concern:*

Be it known that I, A. R. MOEN, of the city, county, and State of New York, have invented a new and useful Improvement in the Construction of Basement, Cellar, and Vault Walls, by which dampness is effectually excluded, and a permanent, dry, and indestructible wall formed with celerity, and cheaply, perfectly water-proof and water-tight; and I do hereby declare the following to be a full, clear, and exact description thereof.

Walls have been built in damp places usually with water-cement, which stands the dampness perfectly well, but does not exclude it from the premises, and is therefore inapplicable to form a dry cellar or basement. To effect this a coat of asphaltum has been laid upon the wall, but it was found impossible to make it stick. Asphaltum will not adhere to stone or brick that has any moisture in it, and therefore this was abandoned. Walls have been built with perfectly dry material with asphaltum as a cement; but to this there were two objections: first, it lacked the durability of a hydraulic-cement wall, and, secondly, it is too expensive for common purposes. All attempts to unite the two into a perfect homogeneous mass with building materials have failed, so far as my knowledge extends. It is true cement foundations have been laid and a coat of asphalt put over them, but they were in no way united, and if water should get under the asphalt with a head to force it it would at once separate the asphalt from the cement below, there being no bond of union between them.

My improvement is for the purpose of overcoming all the previously-existing difficulties by binding together in one homogeneous or perfectly united mass the cement, building material, (brick or stone,) and asphaltum. To effect this, I prepare the stones or bricks, or other suitable material to be used, by drying them thoroughly and then coating one side of them with asphaltum, which, while they are in that state, firmly adheres to and incorporates itself therewith, so that no after dampness can separate them. This coating can, if thought desirable, be extended down the sides of the stone an inch, more or less, all around. Thus prepared, the stone or bricks can be laid into a wall with hydraulic cement or other suitable cement or mortar. I prefer, however, hydraulic cement for wet places as the only suitable material. After the wall is laid with the asphaltum sides out they are ready to receive a coat of melted asphaltum, which is made to fill all the interstices between the stones and give a perfect surface over the whole wall, through which no dampness can penetrate. This wall possesses all the permanence and valuable qualities of a cement wall, together with the additional invaluable advantages of a perfectly water-proof wall, by the intimate and indissoluble connection of two antagonist cements—namely, asphaltum and hydraulic cement—by means of the stone or brick used in constructing the wall. Floors can also be constructed in the same manner.

Having thus fully described the characteristics of my invention, what I claim therein as new, and for which I desire to secure Letters Patent, is—

The mode herein described of forming walls and floors by combining into one mass the cement and asphaltum by means of the stone or other suitable material, as herein specified, by which the asphaltum is caused perfectly to adhere to the bricks or stone of the wall, and admits the hydraulic cement also, to adhere to the same stone or brick, as above described.

A. R. MOEN.

Witnesses:
 JOSHUA M. BEACH,
 ELEAZAR S. VAUGHN.